United States Patent [19]
Babitch

[11] Patent Number: 5,825,812
[45] Date of Patent: Oct. 20, 1998

[54] SUPPRESSED SIDE LOBE DIRECT-SEQUENCE-SPREAD-SPECTRUM RADIO COMMUNICATION METHOD AND DEVICE

[75] Inventor: Daniel Babitch, San Jose, Calif.

[73] Assignee: Wireless Logic, Inc., San Jose, Calif.

[21] Appl. No.: 656,980

[22] Filed: Jun. 6, 1996

[51] Int. Cl.[6] .............................. H04B 15/00; H04K 1/00; H04L 27/30
[52] U.S. Cl. ............................................. 375/206; 375/295
[58] Field of Search ...................................... 375/200, 206, 375/269, 282, 273, 279, 254, 278, 284, 285, 296, 240, 297, 308, 361, 295; 327/12, 64, 97, 164; 341/70; 455/63

[56] References Cited

U.S. PATENT DOCUMENTS

| | | |
|---|---|---|
| 4,130,802 | 12/1978 | Nossen et al. . |
| 4,353,031 | 10/1982 | Bock ........................................ 328/62 |
| 4,580,139 | 4/1986 | Wheathers et al. . |
| 4,592,009 | 5/1986 | Masheff . |
| 4,644,565 | 2/1987 | Seo et al. . |
| 4,860,308 | 8/1989 | Kamerman et al. . |
| 4,862,478 | 8/1989 | McIntosh ............................... 375/200 |
| 5,245,612 | 9/1993 | Kachi et al. . |
| 5,303,258 | 4/1994 | Nakamura .............................. 375/200 |
| 5,311,541 | 5/1994 | Sanderford, Jr. ....................... 375/200 |
| 5,353,352 | 10/1994 | Dent et al. . |
| 5,400,359 | 3/1995 | Hikoso et al. .......................... 375/200 |
| 5,422,913 | 6/1995 | Wilkinson .............................. 375/347 |
| 5,506,862 | 4/1996 | McIntosh ............................... 375/200 |
| 5,545,976 | 8/1996 | Cutler . |
| 5,548,253 | 8/1996 | Durrant .................................. 332/103 |
| 5,623,487 | 4/1997 | Natali .................................... 370/342 |
| 5,668,795 | 9/1997 | Magill et al. ........................... 370/209 |
| 5,687,166 | 11/1997 | Natali et al. ........................... 370/209 |

*Primary Examiner*—Jason Chan
*Assistant Examiner*—Jean B. Corrielus
*Attorney, Agent, or Firm*—Thomas E. Schatzel; Law Offices of Thomas E. Schatzel, A Prof. Corporation

[57] ABSTRACT

A direct sequence spread spectrum (DSSS) radio communication system of the present invention comprises a transmitter and a matching receiver. The transmitter includes a pseudorandom number (PRN) code generator, a chip clock generator and a 16× clock generator that runs at sixteen times the chip clock rate. The output of the PRN code generator and chip clock generator are exclusive-OR'ed to derive a Manchester encoding of the DSSS spreading code. A tri-state buffer is used to deliver such Manchester encoded DSSS spreading code to a mixer to spread a biphase shift keyed (BPSK) radio carrier before being transmitted. The tri-state buffer can be a part of the exclusive-OR logic and is connected to place its output in a high impedance state one sixteenth of every chip clock period. This provides for a suppression of the spurious sidebands that otherwise limit adjacent channel packing.

10 Claims, 3 Drawing Sheets

SUPPRESSED SIDE LOBE DIRECT-SEQUENCE-SPREAD-SPECTRUM RADIO COMMUNICATION METHOD AND DEVICE

BACKGROUND OF THE INVENTION

1. Field of the Invention

The invention relates generally to radio communication methods and systems and more specifically to direct sequence spread spectrum wireless telephone sets.

2. Description of the Prior Art

Conventional direct sequence spread spectrum (DSSS) wireless communication has now become very popular to use in cordless telephones and other consumer electronics. But at the very high carrier frequencies used, e.g., UHF and microwave, the communication links often suffer from multipath interference.

Typical wireless telephone sets operate in full duplex mode, meaning that they apparently send and receive at the same time. Both time division and frequency division techniques have been used to support such full duplex channels. Since direct sequence spread spectrum signals can put a high proportion of the total energy far away from the carrier, it has been difficult, without allowing severe overlap of spectra, to pack more than two such DSSS carriers in the twenty-six megahertz band of 902–928 MHz allowed for unlicensed use by the US Federal Communications Commission (FCC). The number of non-overlapping channels is inversely proportional to the spreading bandwidth. For illustrative purposes we assume a spreading rate of one to two Mcps (mega chips per second). If the spreading rate is much less, then the number of channels can increase, but the interference rejection, also known as spreading gain, is proportionately reduced. Thus it is always desired to spread as much as possible, limited by allowed out-of-band emissions, and by the need to have minimal overlap of channels. The out-of-band signal energies are strictly limited in one square step to −20 dBr. Therefore, DSSS methods and equipment that hold their out-of-band signal energies to lower levels would allow packing as many as four or five DSSS carriers in the twenty-six megahertz band allocated for cordless telephone set use. The same arguments apply to other bands where spread spectrum signals are permitted.

Conventional DSSS transmissions produce one main energy lobe centered on the carrier frequency and dozens of wide side lobes at fairly constantly diminishing energies shoulder-to-shoulder marching away from the carrier frequency.

The prior art does not offer a solution to providing DSSS transmissions with specially attenuated side lobes beyond the band edges, other than sharper conventional bandpass filtering which is considered obvious and has a significant cost disadvantage. Beyond the band edges are where the law requires that the transmitted energies be limited in a square step down from the maximum-permitted in-band signal levels to much lower out-of-band signal levels, e.g., twenty decibels down.

SUMMARY OF THE PRESENT INVENTION

It is therefore an object of the present invention to provide a DSSS radio communication system with lower out-of-band energies that permits the use of more channels in band.

It is another object of the present invention to provide a DSSS modulation method that nulls the largest side lobes of a DSSS transmission in the frequency demarcation areas defined by regulatory agencies for out-of-band signal amplitude levels.

Briefly, a DSSS radio communication system of the present invention comprises a transmitter and a matching receiver. The transmitter includes a pseudorandom number (PRN) code generator, chip clock generator and a 16× clock generator that runs at sixteen times the chip clock rate. The output of the PRN code generator and chip clock generator are exclusive-OR'ed to derive a Manchester encoding of the DSSS spreading code. The proposed technique works equally well without Manchester coding. Manchester coding is part of the implementation but not a new invention. A tri-state buffer is used to deliver such Manchester encoded DSSS spreading code to a mixer that uses it to spread a biphase shift keyed (BPSK) radio carrier before being transmitted. We require that the mixer can shut off the signal and will do so if the input current is zero. This is indeed the case for many passive mixers. For active mixers it may be necessary to bias the high impedance state to a voltage halfway between the minimum and maximum PN-junction voltages. The tri-state buffer can be a part of the exclusive-OR logic and is connected to place its output in a high impedance state one sixteenth of every chip clock period. One can move the position of the spectral null closer to the center frequency by increasing the duration of the high-impedance (signal off) state. This generates a spectral null which provides for a suppression of the largest out-of-band sidebands that otherwise limit adjacent channel packing.

An advantage of the present invention is that a DSSS radio communication system is provided with lower out-of-band energies that permits the use of more channels in band because channels can be placed closer to the band edge than would be possible without this technique.

Another advantage of the present invention is that a DSSS modulation method is provided that nulls the largest side lobes of a DSSS transmission in the frequency demarcation areas defined by regulatory agencies for in band and out-of-band signal amplitude levels.

Another advantage of the present invention is that a grossly nonlinear power amplifier may be used without compromising the desired spectrum because the input radio frequency to the amplifier is turned completely off for short periods and this causes the output to turn off even for a very nonlinear amplifier.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a radio communication system embodiment of the present invention;

FIG. 2 is a graph representing the frequency sidebands generated in the radio frequency spectrum from the carrier at zero frequency, without (lobes "A") and with (lobes "B") the methods and apparatus of the present invention; and FIG. 3 is a functional block diagram of a second radio communication system embodiment of the present invention that differs from that shown in FIG. 1 by the connection of the on/off control to the RF power amplifier stage in the transmitter.

DETAILED DESCRIPTION OF THE PREFERRED EMBODIMENTS

Figure 1:
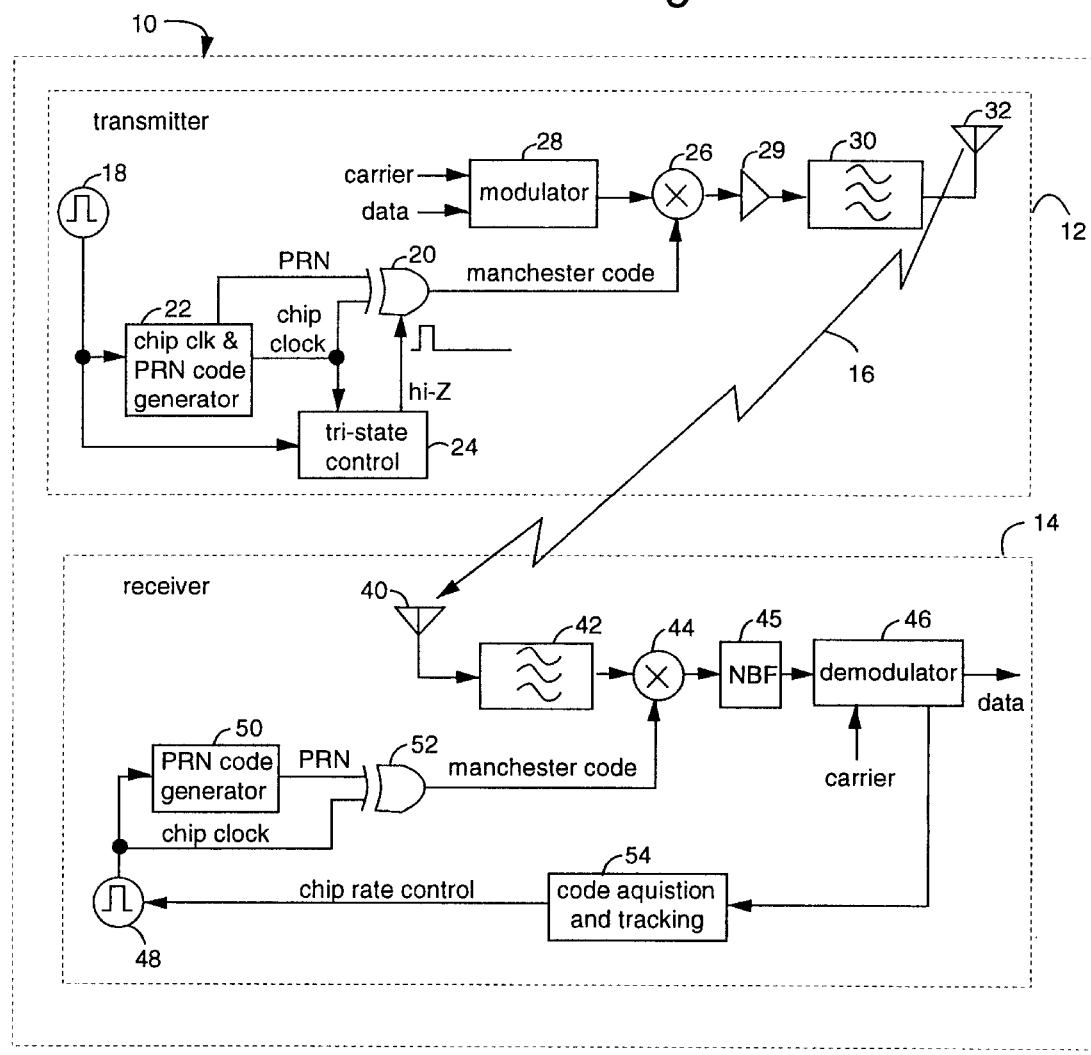

FIG. 1 illustrates a radio communication system embodiment of the present invention, referred to herein by the general reference numeral 10. The system 10 comprises a direct sequence spread spectrum (DSSS) radio transmitter 12 and a matching DSSS radio receiver 14 that communicate over a radio signal 16. For example, the radio signal 16 may be in the twenty-six megahertz band of 902–928 MHz to allow unlicensed operation in the United States.

In the following description, the use of Manchester coding is in no way necessary to the generation of the spectrally-tailored signal which constitutes the proposed invention. The radio transmitter 12 comprises a digital clock generator 18 that operates at sixteen times a basic "chip" rate for DSSS modulation. A tri-state output controlled exclusive-OR logic gate 20 is connected to receive a chip clock and a pseudo-random number (PRN) from a chip-clock and PRN code generator 22. The exclusive-OR part of the logic gate 20 produces Manchester encoding, e.g., one-zero, zero-one, from the PRN modulating code for the DSSS and has the effect of creating a double main lobe at the transmission carrier frequency. A tri-state controller 24 combines such 16× clock and chip clock to produce a digital control signal with a 15/16 duty cycle synchronized to the chip clock rate that is used to control the output of the logic gate 20. The tri-state output control part of the logic gate 20 forces the output to a mixer 26 to go to a high impedance state (hi-Z) for one sixteenth of every chip period at the time of chip transition. This turns off the mixer 26 during such hi-Z periods and has the overall effect of specially attenuating the transmitted side lobes in a range removed from the carrier frequency, e.g., ±fclock/2 MHz of the carrier in the 902–928 MHz band. If the hi-Z duration is 2/16ths of a chip then the nulls are located at ±fclock/4. The carrier frequency and data to be communicated are applied to a biphase shift keyed (BPSK) modulator 28. The composite is amplified by a RF power amplifier stage 29 and filtered by a RF-bandpass filter 30 after mixing with the PRN code. An antenna 32 couples the radio signal 16 to the ether.

The RF-bandpass filter 30 is a full-band filter type and need not be specially adapted to each in-band channel being used. A power amplifier will typically follow the mixer 26 in practical designs. Additional frequency up-conversion may also be used. The logic gate 20 may comprise discrete exclusive-OR and tri-state buffering that are implemented in separate semiconductor devices. The mixer 26 is conditioned to assume a proper, stable off state when its input from the logic gate 20 goes to its high impedance state, e.g., the input is not simply allowed to float and cause problems with oscillation or false triggering. A voltage divider on the input may provide such input conditioning. Other digital techniques, that will be readily apparent to artisans, can be used to combine the PRN code, chip clock and BPSK modulated carrier, e.g., to effect a side lobe suppression that tracks in frequency from the carrier in relation to the pulse width of the gating of the PRN code.

The receiver 14 includes an antenna 40, a RF-bandpass filter 42, a mixer 44 for PRN code removal, a narrow-band filter 45 and a demodulator 46 for carrier removal. A chip clock generator 48 is connected to a PRN code generator 50 and an exclusive-OR logic gate 52. The Manchester coding that results is used to strip off the Manchester-encoded PRN code from the transmitter 12 in the mixer 44. The demodulator 46 provides a detected amplitude control signal to a code acquisition and tracking processor 54. This, in turn, provides frequency and phase control to the chip clock generator 48 to match the local code phase to the received code phase.

Embodiments of the present invention suppress spectral side lobe emissions and place a broad extra null at approximately f=fcarrier±fchip clock/2. Changing the width, e.g., duty cycle, of the pulse coming out of the logic gate 20 will change the frequency of the null.

Figure 2:
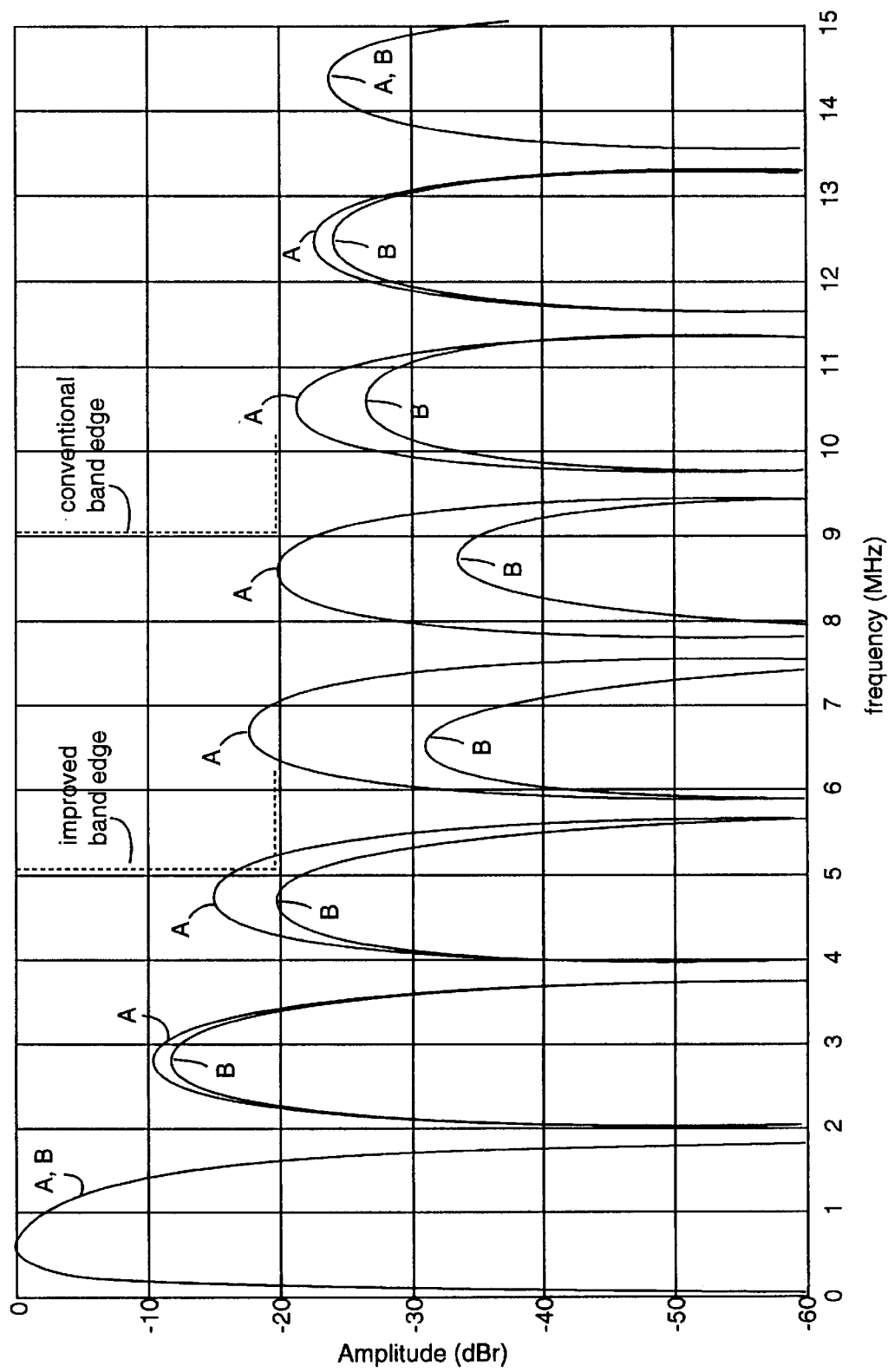

FIG. 2 shows how the carrier can be placed closer to the band edge without violating FCC spectral emission requirements using the techniques of the present invention. Without this method the carrier can usually be no closer than 8.7 MHz from the band edge. The present invention allows the carrier to be placed as close as 4.8 MHz from the band edge. This allows space for more carriers in band, e.g., more frequency channels that do not overlap on the main lobe peaks.

Figure 3:
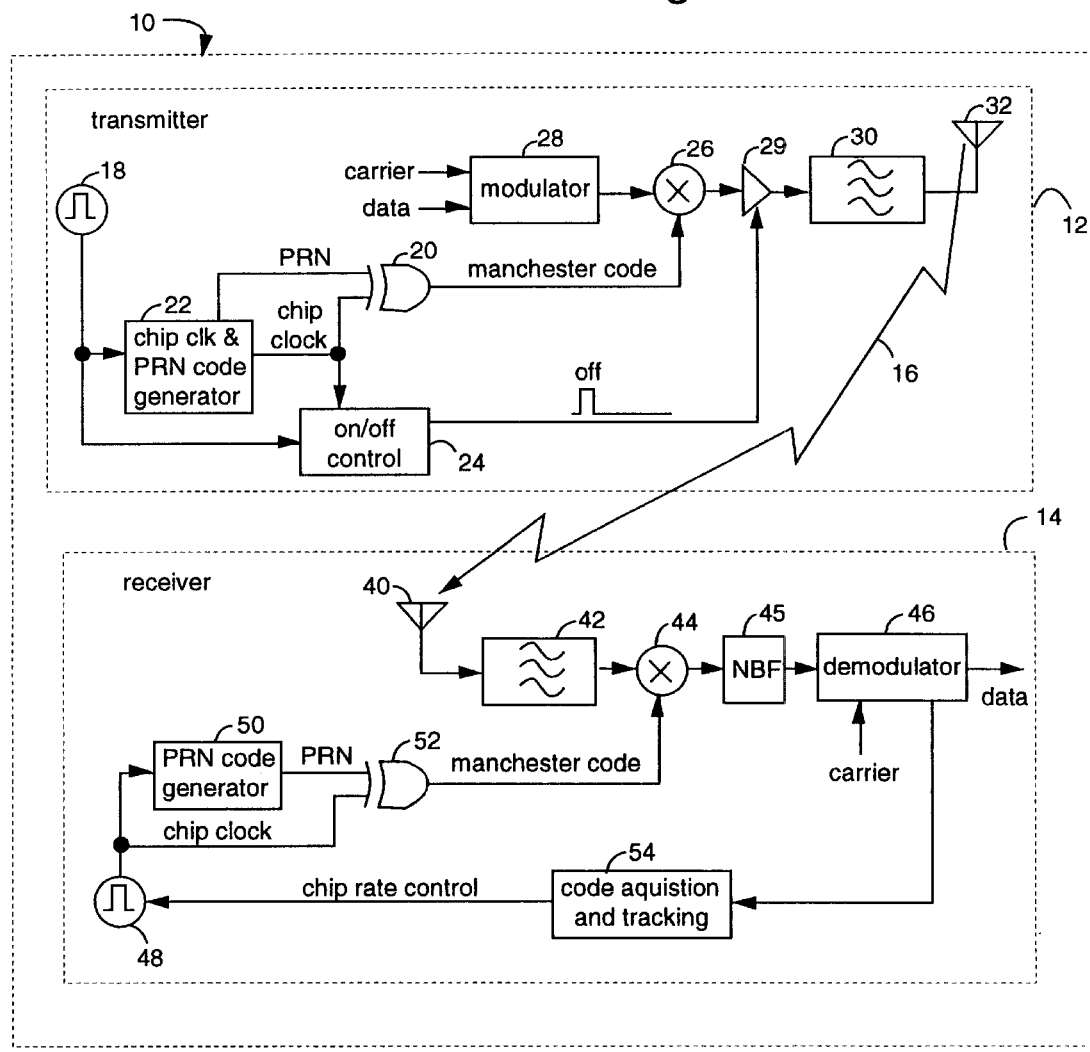

FIG. 3 is a functional block diagram of a second radio communication system embodiment of the present invention that differs from that shown in FIG. 1 by the connection of the on/off control 24 to the RF power amplifier stage 29 in the transmitter 12. The element numbers are repeated from FIG. 1 because the elements are essentially the same. The RF amplifier 29 is periodically turned off and this achieves the same result as described in connection with FIG. 1.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A direct sequence spread spectrum (DSSS) radio transmitter, comprising:

a biphase shift keyed (BPSK) modulator having a pair of inputs for a carrier frequency and a data-to-be-communicated;

a mixer having a first and second mixing input and an output connected to a radio frequency power output stage and transmitting antenna, wherein said second mixing input is connected to receive an output of the BPSK modulator;

a chip clock generator and pseudorandom number (PRN) code generator connected to provide a PRN DSSS spreading code to said first input of the mixer;

a logic gate with a controllable high-impedance output connected to said second input of the mixer and to control the application of said PRN DSSS spreading code in said mixer and that provides for spectral side lobe nulling of a transmitted signal amplified from an output of said mixer.

2. The transmitter of claim 1, further comprising:

a system clock generator connected to the chip clock generator and the gating means and providing a trigger to the chip clock generator and gating means, wherein the gating means is operated for a fixed fraction of each chip clock period and coincident to the chip transition time.

3. The transmitter of claim 1, further comprising:

a 16× system clock generator connected to the chip clock generator and the gating means and providing a clock at sixteen times a PRN code chip rate to the chip clock generator and gating means, wherein the gating means is operated for one sixteenth of each chip clock period.

4. A direct sequence spread spectrum (DSSS) radio transmitter, comprising:

a chip clock generator and pseudorandom number (PRN) code generator connected to provide a PRN DSSS spreading code to a mixer with an input for a radio carrier with biphase shift keyed (BPSK) data modulation; and a tri-state control gate connected to disable the application of said PRN DSSS spreading code to said mixer and that provides for spectral side lobe nulling of a transmitted signal amplified from an output of said mixer; and a 16× system clock generator connected to the chip clock generator and the tri-state control gate and providing a clock at sixteen times a PRN code chip rate to the chip clock generator and tri-state control gate, wherein the tri-state control gate is placed in its high impedance output condition for one sixteenth of each chip clock period.

5. The transmitter of claim 4, wherein:

the chip clock generator and pseudorandom number (PRN) code generator includes an exclusive-OR gate to generate said PRN DSSS spreading code from a PRN code input and a chip clock input.

6. The transmitter of claim 5, wherein:

the chip clock generator and pseudorandom number (PRN) code generator further includes said tri-state control gate in said exclusive-OR gate.

7. A method for direct sequence spread spectrum (DSSS) radio transmission, the method comprising:

turning a code spreading mixer on and off at a rate related to a chip clock rate, wherein said code spreading mixer is connected to input a radio carrier with biphase shift keyed (BPSK) data modulation and to output a DSSS Manchester encoded PRN coded radio signal;

wherein, the turning of said code spreading mixer on and off includes the use of a tri-state buffer connected to disable the application of said Manchester encoded PRN DSSS spreading code to said mixer and provides for spectral side lobe nulling of a transmitted signal amplified from an output of said mixer.

8. A method for direct sequence spread spectrum (DSSS) radio transmission, the method comprising:

turning a code spreading mixer on and off at a rate related to a chip clock rate, wherein said code spreading mixer is connected to input a radio carrier with biphase shift keyed (BPSK) data modulation and to output a DSSS Manchester encoded PRN coded radio signal:

wherein, the turning of said code spreading mixer on and off includes adjusting at least one of the duty cycle and rate of said turning on and off, wherein the frequency of said spectral side lobe nulling of said transmitted signal is changed to an adjacent frequency.

9. A direct sequence spread spectrum (DSSS) radio transmitter, comprising:

a chip clock generator and pseudorandom number (PRN) code generator connected to provide a PRN DSSS spreading code to a mixer with an input for a radio carrier with biphase shift keyed (BPSK) data modulation;

gating means connected to control the application of said PRN DSSS spreading code in said mixer and that provides for spectral side lobe nulling of a transmitted signal amplified from an output of said mixer; and a system clock generator connected to the chip clock generator and the gating means and providing a trigger to the chip clock generator and gating means, wherein the gating means is operated for a fixed fraction of each chip clock period and coincident to the chip transition time.

10. A direct sequence spread spectrum (DSSS) radio transmitter, comprising:

a chip clock generator and pseudorandom number (PRN) code generator connected to provide a PRN DSSS spreading code to a mixer with an input for a radio carrier with biphase shift keyed (BPSK) data modulation;

gating means connected to control the application of said PRN DSSS spreading code in said mixer and that provides for spectral side lobe nulling of a transmitted signal amplified from an output of said mixer; and a 16× system clock generator connected to the chip clock generator and the gating means and providing a clock at sixteen times a PRN code chip rate to the chip clock generator and gating means, wherein the gating means is operated for one sixteenth of each chip clock period.

* * * * *